(12) United States Patent
Yoshizumi

(10) Patent No.: US 9,639,073 B2
(45) Date of Patent: May 2, 2017

(54) INFORMATION PROCESSING APPARATUS FOR DISCRIMINATING BETWEEN COMBINED RESULTS OF PLURALITY OF ELEMENTS, PROGRAM PRODUCT AND METHOD FOR SAME

(71) Applicant: International Business Machines Corporation, Armonk, NY (US)

(72) Inventor: Takayuki Yoshizumi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 13/868,144

(22) Filed: Apr. 23, 2013

(65) Prior Publication Data

US 2013/0289757 A1 Oct. 31, 2013

(30) Foreign Application Priority Data

Apr. 26, 2012 (JP) ................................. 2012-101470

(51) Int. Cl.
*G06F 19/00* (2011.01)
*G05B 13/02* (2006.01)
(Continued)

(52) U.S. Cl.
CPC ....... *G05B 15/02* (2013.01); *G05B 19/40935* (2013.01); *G05B 2219/35162* (2013.01); *Y02P 90/265* (2015.11)

(58) Field of Classification Search
CPC .............. G05B 15/02; G05B 19/40935; G05B 2219/35162; Y02P 90/265
(Continued)

(56) References Cited

U.S. PATENT DOCUMENTS 4,129,033 A * 12/1978 Otterbach ........................ 73/772
4,402,121 A * 9/1983 Blakely et al. ........... 29/890.039
(Continued)

FOREIGN PATENT DOCUMENTS

JP 06-142724 A 5/1994
JP 07-006184 A 1/1995
(Continued)

OTHER PUBLICATIONS

Dash et al., "Production Design for Plate Products in the Steel Industry", 2007, IBM, pp. 345-362.*
(Continued)

*Primary Examiner* — Robert Fennema
*Assistant Examiner* — Thomas Stevens
(74) *Attorney, Agent, or Firm* — Ido Tuchman; Jennifer R. Davis

(57) ABSTRACT

An information processing apparatus, article of manufacture and method for discriminating between combined results of a plurality of elements. The apparatus includes: an assigning unit that assigns an element identification value to each of a plurality of basic elements, a generating unit that combines two or more basic elements, among the plurality of basic elements, so as to generate a combined element representing the two or more combined basic elements, and a calculating unit that merges, through an operation corresponding to an element combination method, a plurality of element identification values individually assigned to the plurality of basic elements contained in the combined element so as to calculate one element identification value for the combined element, where two elements are combined by an order-considered or ordered-ignored combination method, the calculating unit merges two corresponding element identification values through an operation where the commutative law holds or does not hold.

17 Claims, 11 Drawing Sheets

(51) Int. Cl.
 *B22D 11/00* (2006.01)
 *G05B 15/02* (2006.01)
 *G05B 19/4093* (2006.01)

(58) Field of Classification Search
 USPC .................................. 700/33, 155; 164/476
 See application file for complete search history.

(56) References Cited

U.S. PATENT DOCUMENTS

| | | | | |
|---|---|---|---|---|
| 5,511,303 | A * | 4/1996 | Tippins et al. | 29/527.7 |
| 5,608,660 | A * | 3/1997 | Morgan et al. | 702/155 |
| 5,810,069 | A * | 9/1998 | Flick et al. | 164/476 |
| 5,991,991 | A * | 11/1999 | Pleschiutschnigg | 29/33 C |
| 6,553,681 | B2 * | 4/2003 | Ekholm et al. | 33/551 |
| 7,640,137 | B2 * | 12/2009 | Numata et al. | 702/167 |
| 8,448,102 | B2 * | 5/2013 | Kornachuk et al. | 716/55 |
| 8,588,953 | B2 * | 11/2013 | Kling | 700/117 |
| 2002/0032551 | A1 * | 3/2002 | Zakiya | G06F 17/30949 703/2 |
| 2002/0035453 | A1 * | 3/2002 | Pond, Jr. | G01V 11/00 703/2 |
| 2003/0051781 | A1 * | 3/2003 | Branagan | 148/561 |
| 2003/0152165 | A1 * | 8/2003 | Kondo et al. | 375/316 |
| 2006/0047616 | A1 * | 3/2006 | Cheng et al. | 706/52 |
| 2006/0100727 | A1 * | 5/2006 | Dash | G05B 19/41865 700/97 |
| 2006/0143897 | A1 * | 7/2006 | Thomanek | 29/527.7 |
| 2010/0242243 | A1 * | 9/2010 | Kroskey et al. | 29/56.5 |

FOREIGN PATENT DOCUMENTS

| | | |
|---|---|---|
| JP | 08-297503 A | 11/1996 |
| JP | 09-128362 A | 5/1997 |
| JP | 10-149206 A | 6/1998 |
| JP | 11-039358 A | 2/1999 |
| JP | 2003-515829 A | 5/2003 |
| JP | 2006-107131 A | 4/2006 |
| JP | 2007-041691 A | 2/2007 |
| WO | WO 2010-092952 A1 | 8/2010 |
| WO | WO 2012/043217 A1 | 4/2012 |

OTHER PUBLICATIONS

Kenichi Ida, other one, "The Proposal of an Inproved Genetic Algorithm for Floorplan Design with Non-slicing Structure", IEICE Transactions, Mar. 1, 2004, vol. J87-A, No. 3, 6 pages.

* cited by examiner

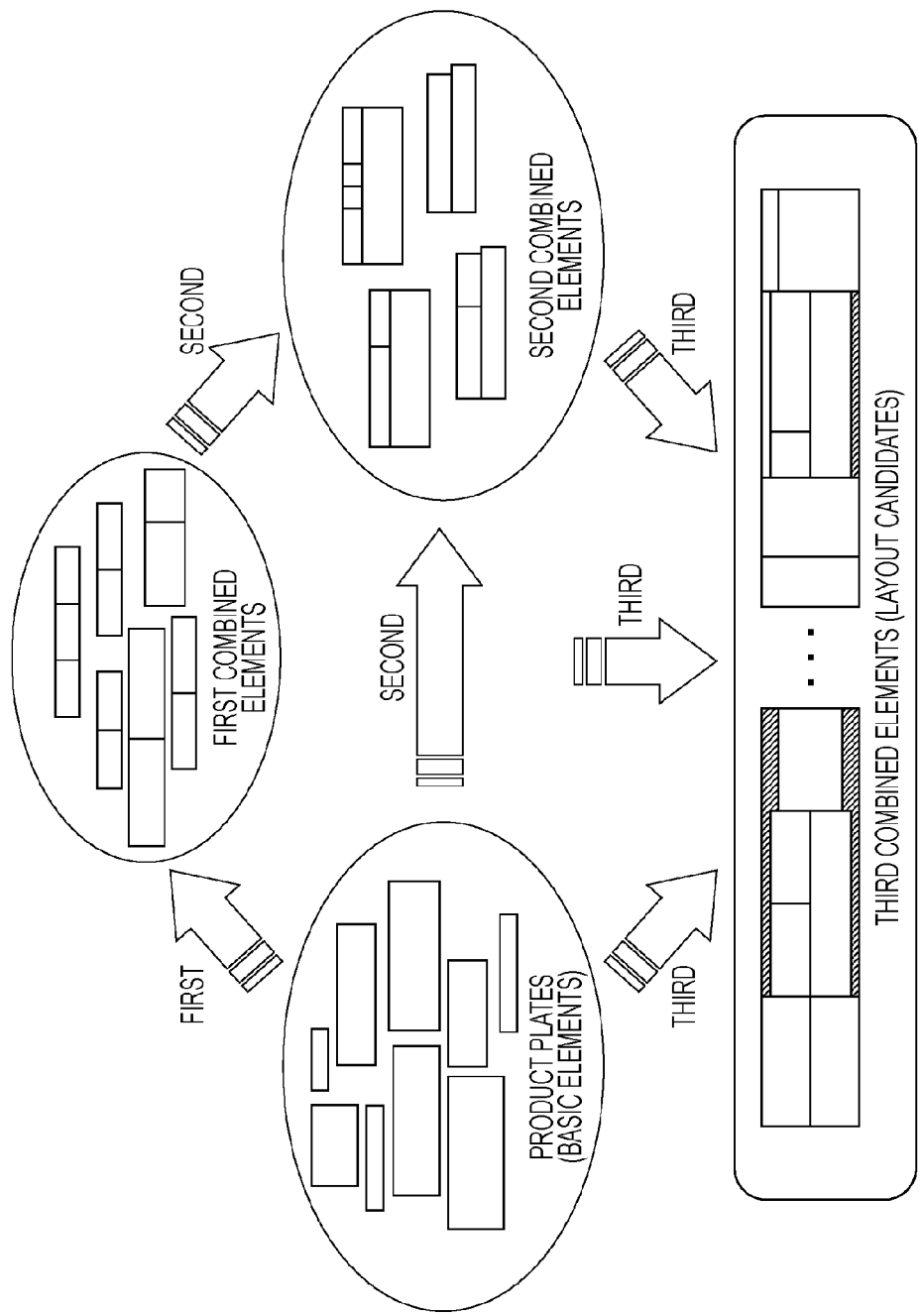

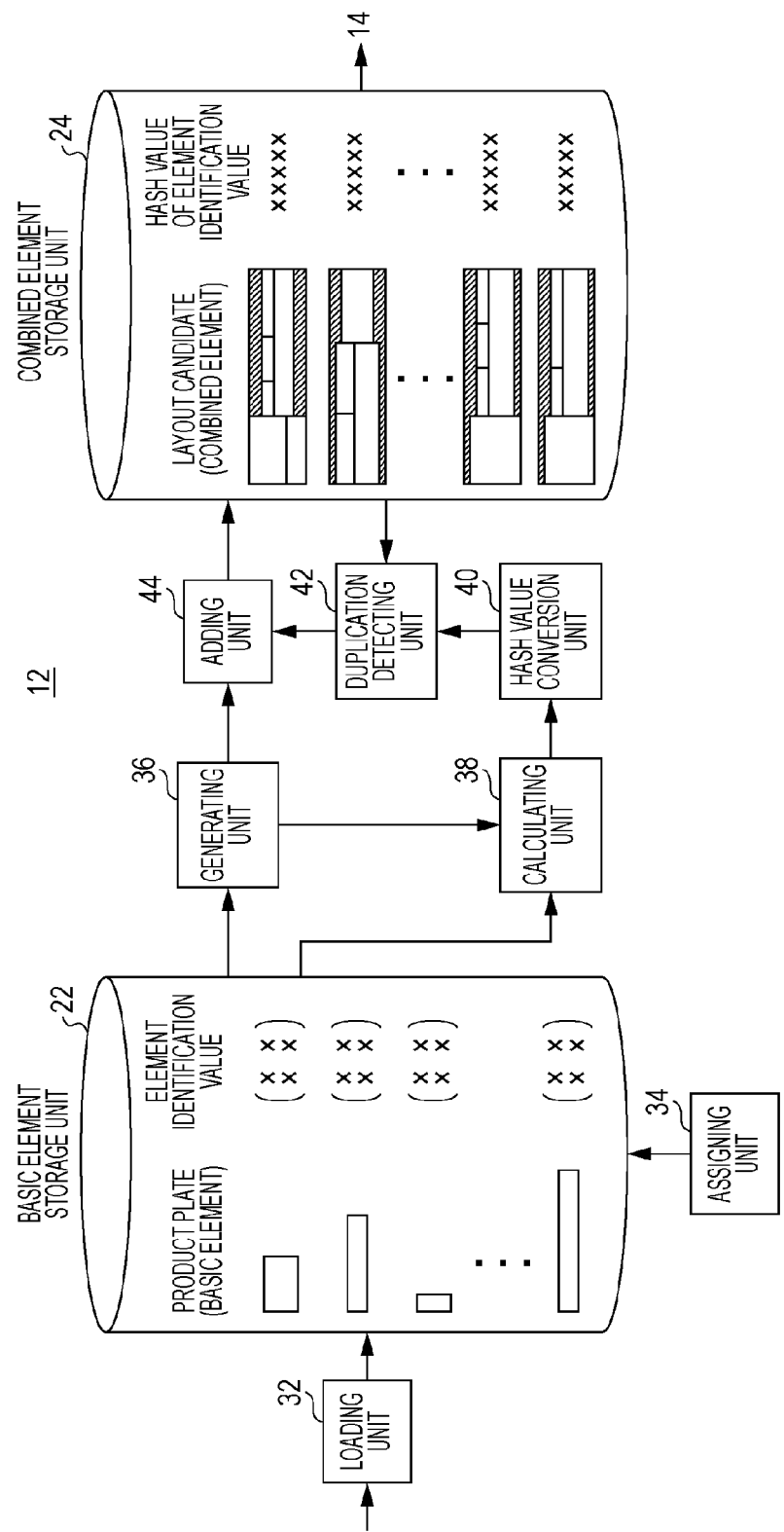

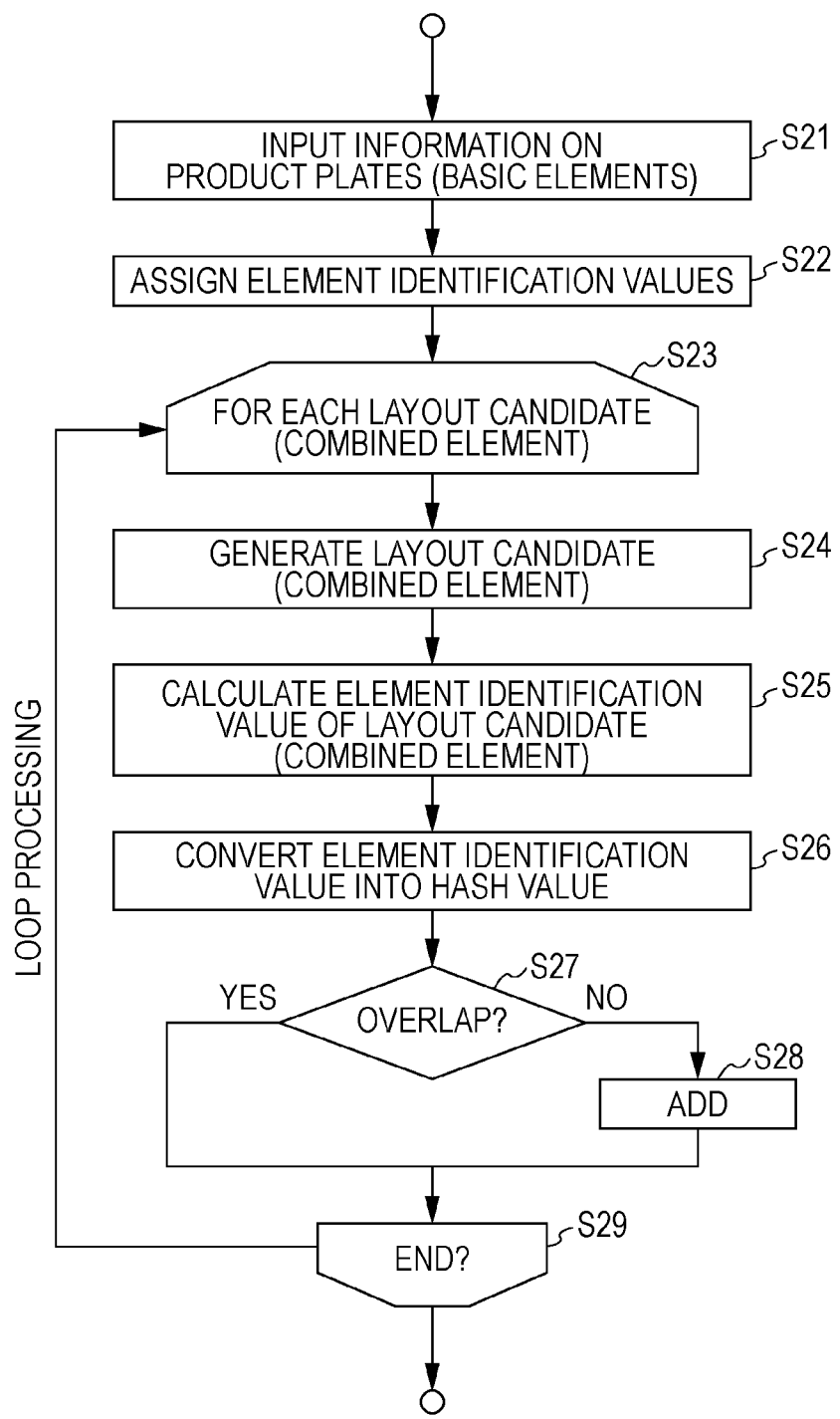

FIG. 7

ELEMENT IDENTIFICATION VALUE    ELEMENT IDENTIFICATION VALUE    MERGED ELEMENT IDENTIFICATION VALUE RESULTING FROM MATRIX MULTIPLICATION $$\begin{pmatrix} a_{11} & a_{12} \\ a_{21} & a_{22} \end{pmatrix} \times \begin{pmatrix} b_{11} & b_{12} \\ b_{21} & b_{22} \end{pmatrix} = \begin{pmatrix} a_{11} \times b_{11} + a_{12} \times b_{21} & a_{11} \times b_{12} + a_{12} \times b_{22} \\ a_{21} \times b_{11} + a_{22} \times b_{21} & a_{21} \times b_{12} + a_{22} \times b_{22} \end{pmatrix}$$

- ASSOCIATIVE LAW HOLDS
  $(A \times B) \times C = A \times (B \times C)$

- COMMUTATIVE LAW DOES NOT HOLD
  $A \times B \neq B \times A$

FIG. 8

ELEMENT IDENTIFICATION VALUE    ELEMENT IDENTIFICATION VALUE    MERGED ELEMENT IDENTIFICATION VALUE RESULTING FROM MATRIX ADDITION $$\begin{pmatrix} a_{11} & a_{12} \\ a_{21} & a_{22} \end{pmatrix} + \begin{pmatrix} b_{11} & b_{12} \\ b_{21} & b_{22} \end{pmatrix} = \begin{pmatrix} a_{11} + b_{11} & a_{12} + b_{12} \\ a_{21} + b_{21} & a_{22} + b_{22} \end{pmatrix}$$

- ASSOCIATIVE LAW HOLDS
  $(A + B) + C = A + (B + C)$

- COMMUTATIVE LAW HOLDS
  $A + B = B + A$

FIG. 10
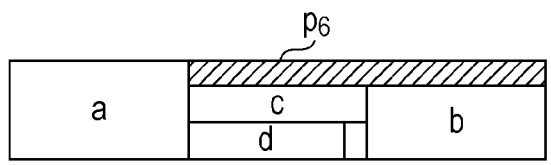
$$P_6 = A + (C \times D) + B = \begin{pmatrix} 80 & 54 \\ 123 & 66 \end{pmatrix}$$
FIG. 11
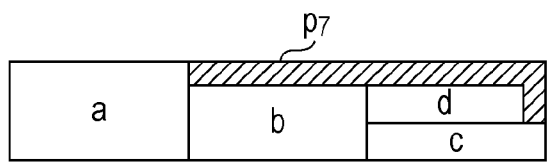
$$P_7 = A + B + (D \times C) = \begin{pmatrix} 88 & 93 \\ 66 & 58 \end{pmatrix}$$
FIG. 12
$$P = \begin{pmatrix} x_{11} & x_{12} \\ x_{21} & x_{22} \end{pmatrix}$$
⇩ CONVERSION INTO HASH VALUE
$$P_{hash} = x_{11} \times 10^0 + x_{21} \times 10^1 + x_{12} \times 10^2 + x_{22} \times 10^3$$

FIG. 13

$$\begin{pmatrix} a_{11} & a_{12} \\ a_{21} & a_{22} \end{pmatrix} \# \begin{pmatrix} b_{11} & b_{12} \\ b_{21} & b_{22} \end{pmatrix} = \begin{pmatrix} a_{11}b_{11} + a_{22}b_{21} & a_{21}b_{22} + a_{12}b_{12} \\ a_{21}b_{11} + a_{12}b_{21} & a_{11}b_{22} + a_{22}b_{12} \end{pmatrix}$$

· ASSOCIATIVE LAW HOLDS
  (A#B)#C = A#(B#C)

· COMMUTATIVE LAW DOES NOT HOLD
  A#B ≠ B#A

FIG. 14

$$\begin{pmatrix} a_{11} & a_{12} \\ a_{21} & a_{22} \end{pmatrix} \& \begin{pmatrix} b_{11} & b_{12} \\ b_{21} & b_{22} \end{pmatrix} = \begin{pmatrix} a_{11}b_{11} & a_{12}b_{12} \\ a_{21}b_{21} & a_{22}b_{22} \end{pmatrix}$$

· ASSOCIATIVE LAW HOLDS
  (A&B)&C = A&(B&C)

· COMMUTATIVE LAW HOLDS
  A&B = B&A

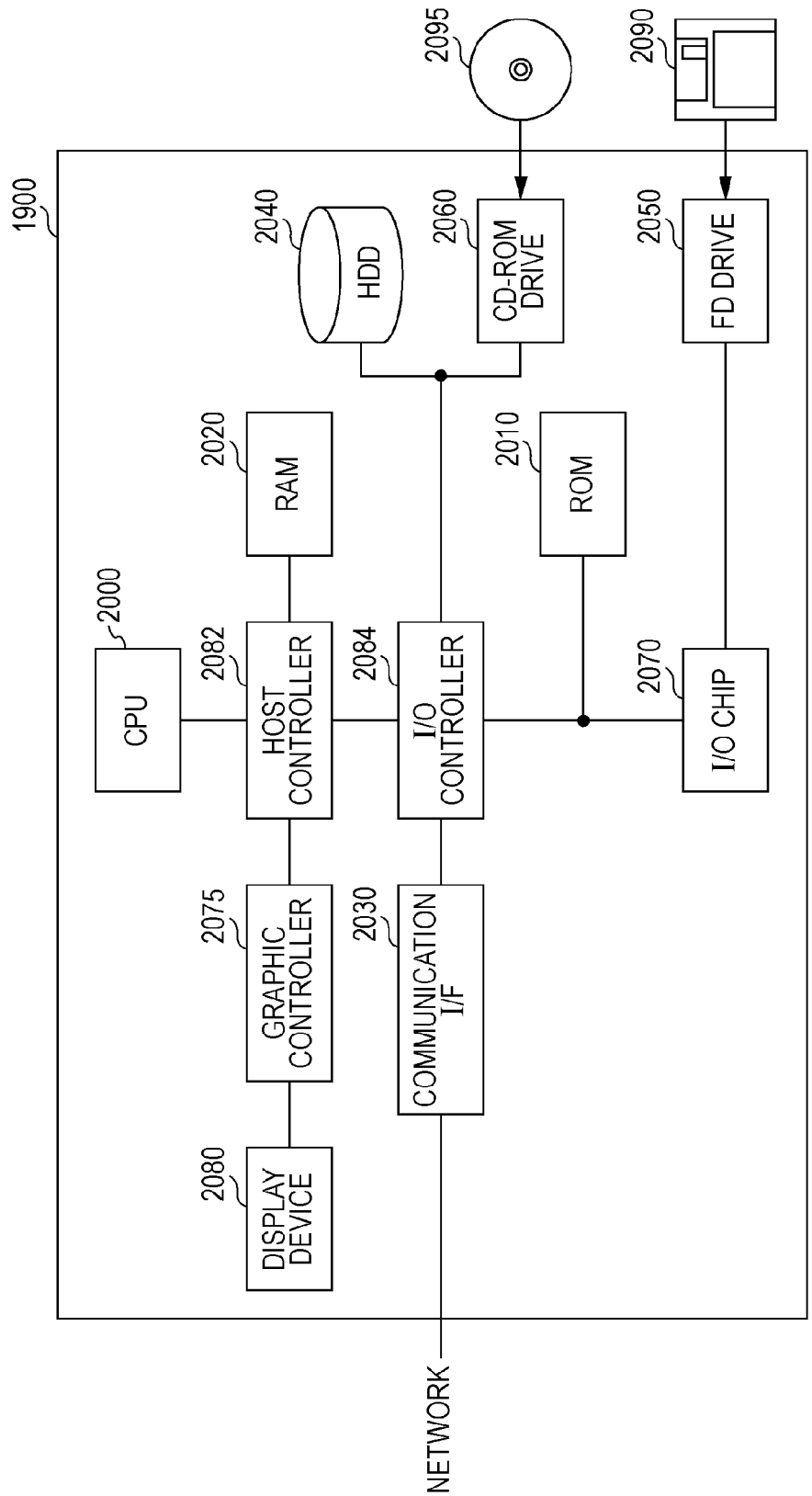

INFORMATION PROCESSING APPARATUS FOR DISCRIMINATING BETWEEN COMBINED RESULTS OF PLURALITY OF ELEMENTS, PROGRAM PRODUCT AND METHOD FOR SAME

CROSS-REFERENCE TO RELATED APPLICATION

This application claims priority under 35 U.S.C. §119 from Japanese Patent Application No. 2012-101470 filed Apr. 26, 2012 the entire contents of which are incorporated herein by reference.

BACKGROUND OF THE INVENTION

1. Field of the Invention

The present invention relates to an information processing apparatus, a program product, and method for discriminating between combined results of a plurality of elements.

2. Description of Related Art

At ironworks, flat steel plates of various sizes are produced in accordance with orders, and are shipped. In production of flat steel plates, long large steel plates (large plates) are first produced through the rolling process. Then, in accordance with the orders, the large plates are cut into a plurality of steel plates (small plates) of various sizes. The resultant small plates are then examined and shipped as products.

When small plates of multiple sizes are cut from a large plate, a waste area that is not used as products increases depending on layouts of cutting positions, decreasing the yield. Thus, at ironworks, the computer computes combinations of layouts that allow efficient cutting out of small plates of multiple sizes from a large plate so as to improve the yield. A method of computing combinations of layouts that allows efficient cutting out of small plates is called the plate design problem.

Japanese Patent Application Publication No. 11-39358 describes a method for allocating plate-shaped products of multiple sizes from original plates. The method allows selection of the optimum layout pattern by creating layout patterns that represent layouts of plate-shaped products that can be cut within original plates and by giving evaluation values to the individual layout patterns and evaluation values to unallocated plate-shaped products.

Japanese Patent Application Publication No. 7-6184 describes a method for finding a plan that minimizes the value of the objective function of evaluation items desired to be minimized in the optimum cutting problem. Japanese Patent Application Publication No. 9-128362 describes a method for selecting the top N process units in descending order of an input value from among N×N process units, which indicate layout positions of N to-be-arranged objects, such that to-be-arranged objects and layout positions are unique, and of obtaining an intended value by changing the input value of the selected process units.

SUMMARY OF THE INVENTION

According to one aspect of the present invention, an information processing apparatus is provided. The apparatus includes: an assigning unit that assigns an element identification value to each of a plurality of basic elements; a generating unit that combines two or more basic elements, among the plurality of basic elements, so as to generate a combined element representing the two or more combined basic elements; and a calculating unit that merges, through an operation corresponding to an element combination method, a plurality of element identification values individually assigned to the plurality of basic elements contained in the combined element, so as to calculate one element identification value for the combined element, where: when two elements are combined by an order-considered combination method, the calculating unit merges two corresponding element identification values through an operation for which the commutative law does not hold, and when two elements are combined by an order-ignored combination method, the calculating unit merges two corresponding element identification values through an operation for which the commutative law holds.

According to another aspect of the present invention, a non-transitory article of manufacture tangibly embodying computer readable instructions which, when implemented, cause a computer to function as an information processing apparatus.

According to still another aspect of the present invention, a method is provided. The method includes: assigning an element identification value to each of a plurality of basic elements; combining two or more basic elements, among the plurality of basic elements, so as to generate a combined elements representing the two or more combined basic elements; and merging, through an operation corresponding to an element combination method, a plurality of element identification values individually assigned to the plurality of basic elements contained in the combined element, so as to calculate one element identification values for the combined element, where: when two elements are combined by an order-considered combination method, two corresponding element identification values are merged through an operation for which the commutative law does not hold, and when two elements are combined by an order-ignored combination method, two corresponding element identification values are merged through an operation for which the commutative law holds.

BRIEF DESCRIPTION OF THE DRAWINGS

FIG. 4 illustrates a method for generating layout candidates performed by a layout generating section of the information processing apparatus according to an embodiment of the present invention.

FIG. 5 illustrates the functional configuration of the layout generating section according to an embodiment of the present invention.

FIG. 6 illustrates a flow of generating layout candidates performed by the layout generating section according to an embodiment of the present invention.

FIG. 7 illustrates an example of a method of merging two element identification values by performing matrix multiplication.

FIG. 8 illustrates an example of a method of merging two element identification values by performing matrix addition.

FIG. 10 illustrates an example of a layout candidate (sixth combined element $p_6$), where the order in which some elements of included elements are combined in the lengthwise direction is different from that of a layout candidate (fourth combined element $p_4$) of FIG. 9, and FIG. 10 also illustrates an example of the corresponding element identification value.

FIG. 11 illustrates an example of a layout candidate (seventh combined element $p_7$), where the order in which some elements of included elements are combined in the widthwise direction is different from that of the layout candidate (fourth combined element $p_4$) of FIG. 9, and FIG. 10 also illustrates an example of the corresponding element identification value.

FIG. 12 illustrates an example of a calculation for converting an element identification value of a combined element into a hash value.

FIG. 13 illustrates an example of a method of merging two element identification values by performing an operation that corresponds to an order-considered combination method.

FIG. 14 illustrates an example of a method of merging two element identification values by performing an operation that corresponds to an order-ignored combination method.

FIG. 15 illustrates an example of the hardware configuration of a computer according to an embodiment of the present invention.

DETAILED DESCRIPTION OF THE PREFERRED EMBODIMENTS

When computing combinations of layouts that allow efficient cutting out of small plates, the computer first generates an enormous number of layout candidates, such as tens of thousands or hundreds of thousands of layout candidates, and evaluation values of the individual layout candidates. Then, from among the generated layout candidates, the computer selects a plurality of layouts that allow cutting of all ordered small plates and gives high evaluation values.

However, in the process of generating an enormous number of layout candidates, such as tens of thousands or hundreds of thousands of layout candidates, the computation cost of the generation is mostly occupied by a method of checking layout candidates that are equivalent to already-generated layout candidates. Thus, to reduce the computation cost of the plate design problem, it is effective to perform at a low computation cost the equivalent check for determining whether or not layout candidates are already-generated layout candidates.

The present invention will be described below through an embodiment of the invention. The embodiment; however, does not limit the present invention described in claims. Additionally, all combinations of features described in the embodiment are not necessarily mandatory for the solutions provided by the present invention.

Figure 1:
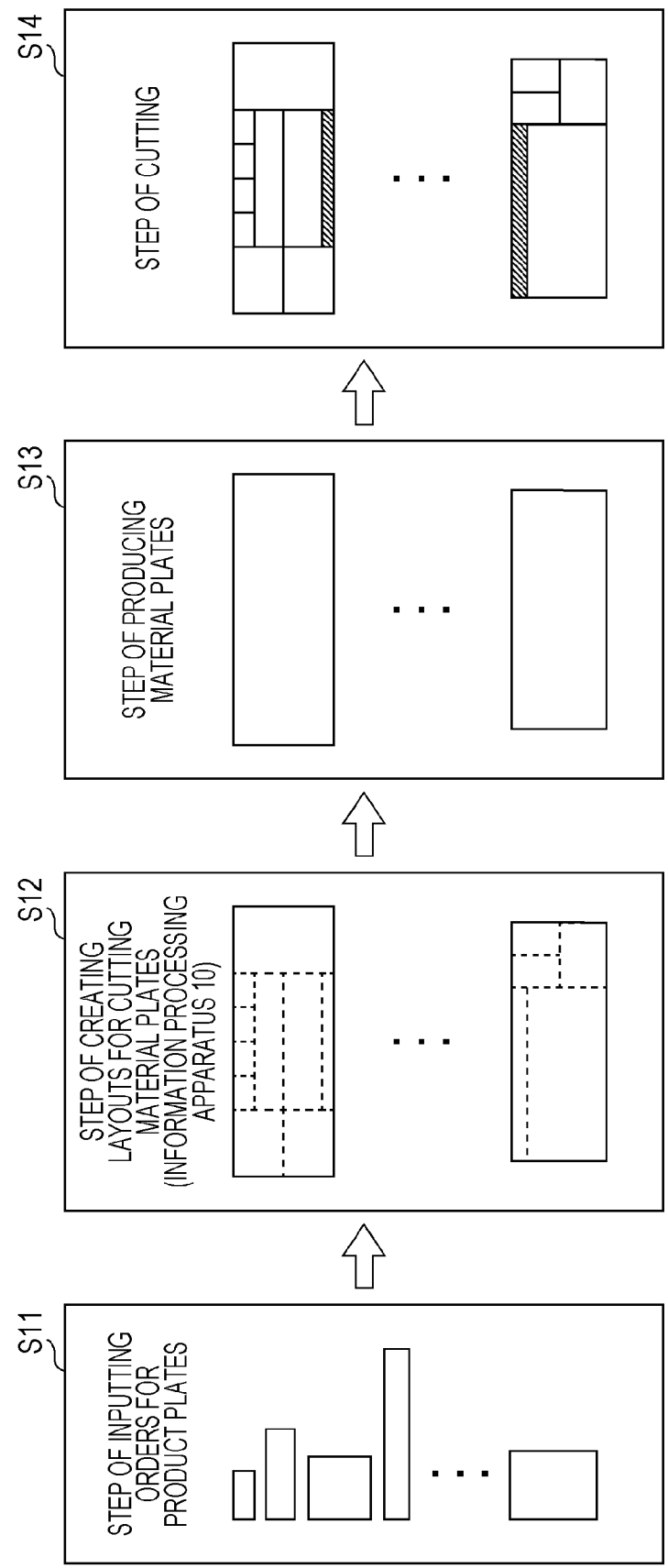
FIG. 1 illustrates a flow of producing steel plates (product plates) according to an embodiment of the present invention.

FIG. 1 illustrates a flow of producing steel plates (product plates) according to an embodiment of the present invention. At an ironworks, flat steel plates having rectangular flat surfaces are produced in accordance with orders from customers and are referred to as product plates.

In production of product plates, a computer receives an input of the size (length and width) of the flat surface of each ordered product plate S11. After receipt of orders of a predetermined number of product plates, the computer creates a plurality of layouts, which indicate cutting positions at which the plurality of ordered product plates are to be cut from a plurality of long steel plates that are to be produced by rolling S12. Rectangular steel plates produced by rolling are referred to as material plates.

Then, at the ironworks, a plurality of material plates having the sizes indicated by the plurality of created layouts are produced by rolling S13. Subsequently, at the ironworks, each of the plurality of material plates is cut in accordance with the corresponding layout S14. In this manner, it is possible to produce a plurality of product plates having the sizes according to the orders at the ironworks.

Information processing apparatus 10, according to an embodiment, performs the layout creation method of S12. A computer implements information processing apparatus 10.

Information processing apparatus 10 generates a plurality of layout candidates, which represent cutting patterns for cutting out product plates from material plates. Information processing apparatus 10 then selects from among the plurality of generated layout candidates, a plurality of layouts with which all the plurality of ordered product plates can be cut out with a high yield.

Information processing apparatus 10 is not limited to an apparatus for generating layout candidates for cutting steel plates at ironworks, and can be used for applications for combining other basic elements. For example, information processing apparatus 10 can be an apparatus that handles words or character strings as basic elements and that generates combined elements (character strings) by combining two or more basic elements.

Figure 2:
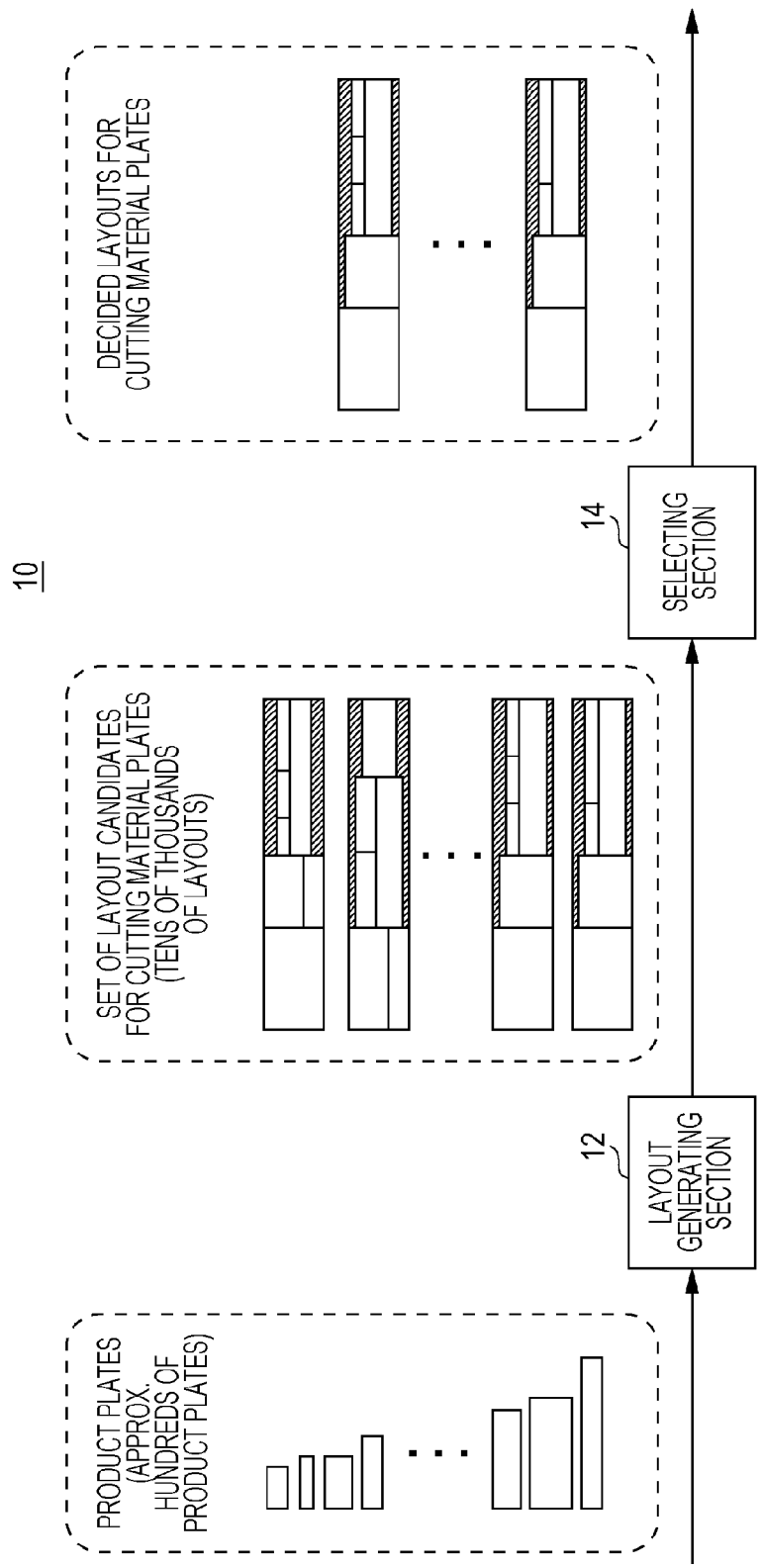
FIG. 2 illustrates the functional configuration of an information processing apparatus according to an embodiment of the present invention.

FIG. 2 illustrates the functional configuration of information processing apparatus 10 according to an embodiment of the present invention. Information processing apparatus 10 includes layout generating section 12 and selecting section 14.

Layout generating section 12 receives a plurality of basic elements, each of which represents the shape and size of a product plate. In an embodiment, product plates have rectangular shapes. Thus, each basic element represents the shape and size of a rectangle. Layout generating section 12 receives, for example, basic elements for hundreds of product plates.

Layout generating section 12 selects two or more basic elements from among the plurality of received basic elements, and combines the two or more selected basic elements. Layout generating section 12 then generates a plurality of layout candidates (plurality of combined elements), which represent cutting patterns for cutting out each of the two or more combined basic elements from material plates. In an embodiment, material plates have rectangular shapes. Thus, layout generating section 12 generates a plurality of layout candidates (plurality of combined elements), which represent cutting patterns for cutting out each of the two or more combined basic elements from rectangular material plates.

Layout generating section 12 generates, for example, layout candidates, the number of which is a hundred times to a thousand times as large as the number of received basic elements (for example, tens of thousands to hundreds of thousands of layout candidates). In this case, layout generating section 12 generates a plurality of layout candidates while eliminating duplications, so as to avoid inclusion of two or more layout candidates that represent the equivalent cutting patterns.

In an embodiment, layout generating section 12 generates layout candidates that represent cutting patterns according to a predetermined cutting rule. An example of the cutting rule and an example of a layout candidate generation method will be described with reference to FIGS. 3 and 4.

From among the plurality of layout candidates (plurality of combined elements) generated by layout generating section 12, selecting section 14 selects a plurality of layouts that include all the plurality of ordered product plates (plurality of basic elements). Selecting section 14 selects a plurality of layouts by including, for example, an algorithm that minimizes the sum of the sizes of the plurality of selected layouts.

For example, by utilizing integer programming, selecting section 14 selects a plurality of layouts that include all the plurality of product plates. In this case, selecting section 14 minimizes the sum of the sizes of the layouts, but the sum is not necessarily actually the minimum. That is, selecting section 14 just has to include, in selecting a plurality of layouts, an algorithm that gives a higher evaluation to a solution that makes the sum of the sizes of the layouts smaller. In this manner, information processing apparatus 10 can select a plurality of layouts with which all the plurality of ordered product plates can be cut out with a high yield.

Figure 3:
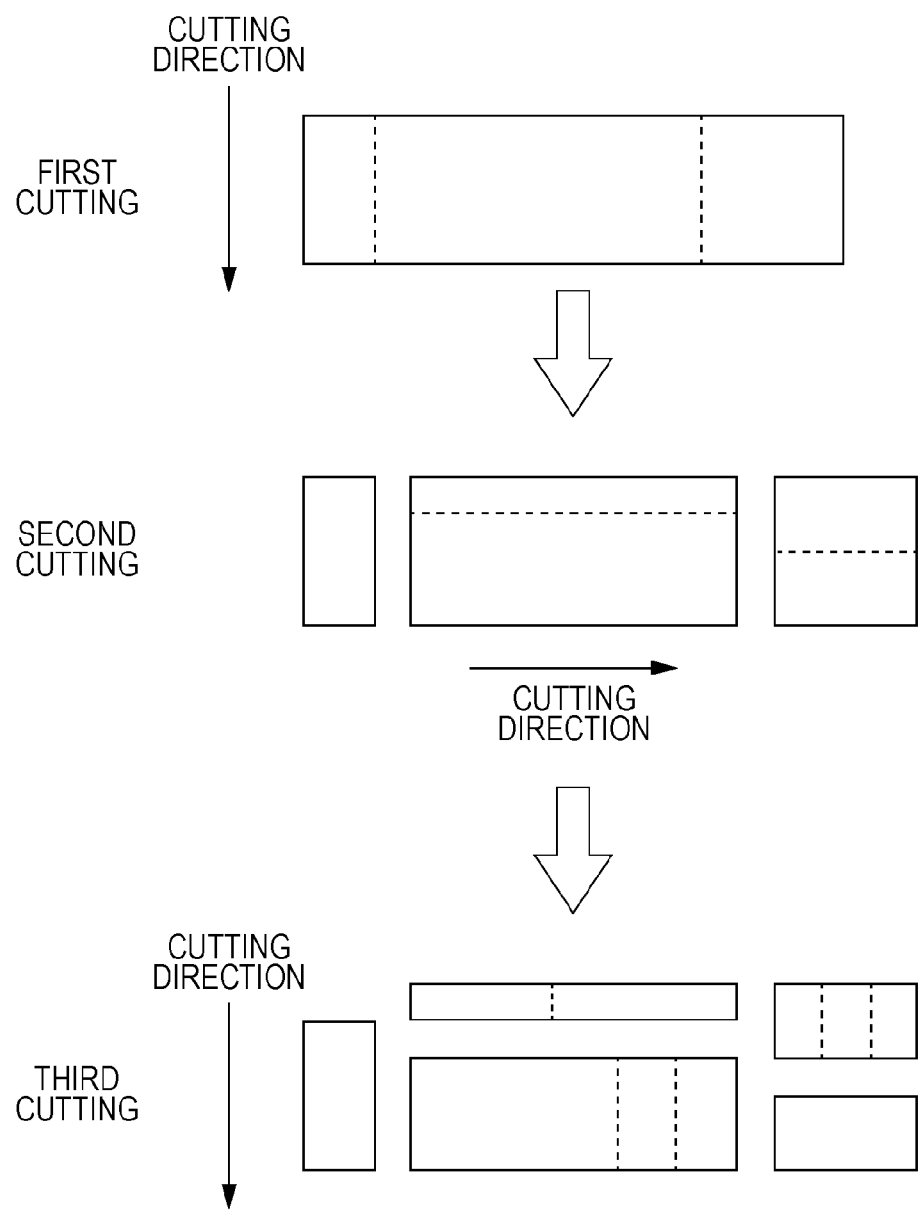
FIG. 3 illustrates an example of a procedure of cutting product plates from a material plate according to an embodiment of the present invention.

FIG. 3 illustrates an example of a procedure of cutting out product plates from a material plate. At the ironworks, in the case of cutting out a plurality of product plates from a long rolled material plate, cutting is made in accordance with a predetermined cutting rule. For example, in an embodiment, cutting is made in accordance with a cutting rule illustrated in FIG. 3.

First, in a first cutting process, the material plate is cut along the short-side direction. Subsequently, in a second cutting process, the material plate is cut along the long-side direction. Then, in a third cutting process, the material plate is cut along the short-side direction. Information processing apparatus 10 generates layout candidates according to such a cutting rule.

FIG. 4 illustrates a layout candidate generation method performed by layout generating section 12 of information processing apparatus 10 according to an embodiment of the present invention. When generating one layout candidate (combined element) by combining a plurality of basic elements that represent the shapes and sizes of product plates, layout generating section 12 generates the layout candidate by combining the plurality of basic elements in the procedure that is opposite to the procedure of cutting out the product plates from a material plate. In this way, layout generating section 12 is able to generate layout candidates according to the cutting rule.

In a first step, layout generating section 12, for example, randomly selects two or more elements from among the plurality of basic elements, and combines the two or more selected elements in a first direction (e.g., lengthwise direction), which is a direction along a given side. Then, layout generating section 12 generates a cutting pattern (first combined element) for cutting out each of the two or more combined elements from a rectangular plate. In the first step, layout generating section 12 generates a plurality of first combined elements described above.

Subsequently, in a second step, layout generating section 12, for example, randomly selects two or more elements from among the plurality of basic elements and the plurality of first combined elements, and combines the two or more selected elements in a second direction (e.g., widthwise direction), which is vertical to the first direction. Then, layout generating section 12 generates a cutting pattern (second combined element) for cutting out the two or more combined elements from a rectangular plate. In the second step, layout generating section 12 generates a plurality of second combined elements described above.

Subsequently, in a third step, layout generating section 12, for example, randomly selects two or more elements from among the plurality of basic elements, the plurality of first combined elements, and the plurality of second combined elements, and combines the two or more selected elements in the first direction. Then, layout generating section 12 generates a cutting pattern (third combined element) for cutting out the two or more selected elements from a rectangular plate. In the third step, layout generating section 12 generates a plurality of third combined elements described above.

Layout generating section 12 then outputs, as a plurality of layout candidates, the third combined elements that have been generated in this manner. In the first, second, and third steps, layout generating section 12 generates combined elements so that the shape of each combined element fits within the shape of the material plate. When outputting the layout candidates, layout generating section 12 performs a duplicate elimination process so as not to output the same layout candidate as the already-generated layout candidate.

FIG. 5 illustrates the functional configuration of the layout generating section 12 according to an embodiment of the present invention. Layout generating section 12 includes basic element storage unit 22, combined element storage unit 24, loading unit 32, assigning unit 34, generating unit 36, calculating unit 38, hash value conversion unit 40, duplication detecting unit 42, and adding unit 44.

Basic element storage unit 22 stores a plurality of basic elements (shapes and sizes of product plates) and element identification values of the basic elements in association with each other. Combined element storage unit 24 stores a plurality of combined elements (layout candidates) and hash values of element identification values of the combined elements in association with each other.

Loading unit 32 loads a plurality of basic elements from the outside, and stores the plurality of loaded basic elements in basic element storage unit 22. In an embodiment, loading unit 32 loads the sizes and shapes of a plurality of product plates as the plurality of basic elements, and stores the sizes and shapes in basic element storage unit 22.

Assigning unit 34 assigns an element identification value to each of the plurality of basic elements. In an embodiment, assigning unit 34 assigns a unique element identification value to each of the plurality of basic elements on the basis of shape and size. Assigning unit 34 then stores the element identification value assigned to each of the plurality of basic elements in basic element storage unit 22 in association with the basic element.

Assigning unit 34 assigns, to basic elements, element identification values which are values that can be calculated through an operation for which the associative law holds but the commutative law does not hold and through an operation for which the associative law and the commutative law hold. In an embodiment, assigning unit 34 assigns, to each of the plurality of basic elements, an element identification value which is a square matrix. Assigning unit 34 assigns, to each of the plurality of basic elements, on the basis of shape and size, a square matrix having entries of random integral values.

When the element identification value is a square matrix, examples of the operation for which the associative law holds but the commutative law does not hold include matrix multiplication. Also, when the element identification value is a square matrix, examples of the operation for which the associative law and the commutative law hold include matrix addition. Assigning unit 34 can assign, as an element identification value, a quaternion to each of the plurality of basic elements.

Generating unit 36 combines two or more basic elements among the plurality of basic elements to generate a plurality of combined elements, each of which represents the two or more combined basic elements. In an embodiment, generating unit 36 combines two or more basic elements among a plurality of basic elements, each of which represents a product plate, to generate a plurality of layout candidates (plurality of combined elements), which represent cutting patterns for cutting out each of the two or more combined basic elements from material plates. Generating unit 36 generates a plurality of layout candidates, for example, in the procedure illustrated in FIG. 4.

Calculating unit 38 generates an element identification value for each of the plurality of layout candidates (plurality of combined elements) generated by generating unit 36. Calculating unit 38 calculates a plurality of element identification values assigned to the plurality of basic elements contained in a layout candidate (combined element) by performing an operation corresponding to an element combination method so as to calculate one element identification value for the layout candidate (combined element).

When two elements are combined by using an order-considered combination method, calculating unit 38 calculates the two corresponding element identification values by performing an operation for which the associative law holds but the commutative law does not hold. In an embodiment, element identification values are square matrices. Thus, when two elements are combined by using the order-considered combination method, calculating unit 38 calculates the two corresponding element identification values by performing matrix multiplication. An example of the calculation method in this case will be further described with reference to FIG. 7.

When two elements are combined by using an order-ignored combination method, calculating unit 38 calculates the two corresponding element identification values by performing an operation for which the associative law and the commutative law hold. In an embodiment, element identification values are square matrices. Thus, when two elements are combined by using the order-ignored combination method, calculating unit 38 calculates the two corresponding element identification values by performing matrix addition. An example of the calculation method in this case will be further described with reference to FIG. 8.

When cutting patterns are identical, element identification values of the layout candidates (combined elements) calculated by calculating unit 38 in this manner are the same. Also, when positions of elements that are combined by using the order-ignored combination method are switched, element identification values for the layout candidates (combined elements) are the same because the layouts are equivalent. Features of generated element identification values will be further described with reference to FIGS. 9 to 11.

Hash value conversion unit 40 converts an element identification value of each of the plurality of layout candidates (plurality of combined elements) into a hash value in accordance with a predetermined rule. For example, hash value conversion unit 40 converts an element identification value, which is a square matrix, into a scalar value in accordance with a predetermined rule, thereby converting an element identification value into a hash value. An example of the hash value conversion method will be further described with reference to FIG. 12.

Based on the hash values of the element identification values of the plurality of layout candidates (plurality of combined elements), duplication detecting unit 42 detects duplicated combined elements among the plurality of combined elements. More specifically, in response to generation of a new layout candidate (combined element) by generating unit 36, duplication detecting unit 42 receives from hash value conversion unit 40 a hash value of the element identification value of the newly generated layout candidate (combined element).

Duplication detecting unit 42 compares the hash value of the element identification value received from hash value conversion unit 40 with the individual hash values of the element identification values of the plurality of already-generated layout candidates (combined elements) stored in combined element storage unit 24 to determine whether the hash values match. If the hash values match, duplication detecting unit 42 determines whether the new layout candidate (combined element) is the same as one of the plurality of already-generated layout candidates (combined elements) stored in combined element storage unit 24.

If the hash value of the element identification value received from hash value conversion unit 40 matches one of the hash values of the element identification values of the plurality of already-generated layout candidates (combined elements) stored in combined element storage unit 24, duplication detecting unit 42 can further analyze the configurations of the layout candidates (combined elements) having the matching hash values of the element identification values in detail to determine whether or not the configurations match. For example, duplication detecting unit 42 can analyze basic elements contained in layout candidates (combined elements) having the matching hash values of the element identification values and the element combination methods to further determine whether or not the layout candidates (combined elements) match.

Also, in an embodiment, combined element storage unit 24 can store the number of included product plates in association with each of the plurality of layout candidates. In this case, duplication detecting unit 42 first detects the number of product plates included in the new layout candidate generated by generating unit 36. Duplication detecting unit 42 then extracts from combined element storage unit 24 one or more layout candidates that include the same number of product plates as the detected number, and determines a duplication between the individual element identification values of the extracted layout candidates and the element identification value of the new layout candidate. In this manner, duplication detecting unit 42 is able to efficiently perform layout candidate duplication detection.

So long as the element identification value of the new layout candidate (combined element) generated by generating unit 36 does not match the element identification values of the layout candidates (combined elements) stored in combined element storage unit 24, adding unit 44 additionally stores the new layout candidate (combined element) and the corresponding element identification value in combined element storage unit 24.

FIG. 6 illustrates a flow of generating layout candidates performed by layout generating section 12 according to an embodiment of the present invention. Layout generating section 12 performs a process of S21 to S29 illustrated in FIG. 6.

First, in S21, loading unit 32 loads, as a plurality of basic elements, the sizes and shapes of a plurality of product plates. Subsequently, in S22, assigning unit 34 assigns a unique element identification value, which is a square matrix, to each of the plurality of basic elements on the basis of shape and size.

Subsequently, layout generating section 12 repeatedly performs processing from S24 to S28 (loop processing between S23 and S29). In the loop processing, in S24, generating unit 36 first generates one layout candidate (combined element). Generating unit 36 generates the layout candidate, for example, in the procedure illustrated in FIG. 4.

Subsequently, in S25, calculating unit 38 calculates an element identification value of the layout candidate (combined element) generated in S24. In this case, calculating unit 38 merges, through an operation corresponding to the element combination method, a plurality of element identification values individually assigned to the plurality of basic elements included in the layout candidate (combined element) so as to calculate the element identification value of the layout candidate.

In the case where two elements are combined by using the order-considered combination method, calculating unit 38 merges the two corresponding element identification values by performing matrix multiplication. When two elements are combined by using the order-ignored combination method, calculating unit 38 merges the two corresponding element identification values by performing matrix addition.

Subsequently, in S26, hash value conversion unit 40 converts the element identification value calculated in S25 into a hash value in accordance with a predetermined rule. Then, in S27, duplication detecting unit 42 determines whether or not the layout candidate generated in S24 is the same as one or more layout candidates that have been thus far generated in the process. More specifically, if the hash value of the element identification value calculated in S26 matches the hash values of the element identification values of the one or more already generated layout candidates, duplication detecting unit 42 determines that the layout candidates are equivalent. If the hash values do not match, duplication detecting unit 42 determines that the layout candidates are not equivalent.

Upon determining that the layout candidates are equivalent (YES in S27), duplication detecting unit 42 discards the new layout candidate generated in S24. The process then proceeds to S29. If duplication detecting unit 42 determines that the layout candidates are not equivalent (NO in step S27), the process proceeds to S28. In S28, adding unit 44 adds the layout candidate (combined element) generated in S24 and the hash value of the element identification value calculated, in S26, in combined element storage unit 24. After adding unit 44 completes the addition, the process proceeds to S29.

In S29, layout generating section 12 determines whether or not to end the layout candidate generation process. For example, after generation of a predetermined number of (for example, tens of thousands of or hundreds of thousands of) layout candidates or after elapse of a predetermined time, layout generating section 12 determines to end the layout candidate generation process. If layout generating section 12 determines not to end the layout candidate generation process, the process returns to S24. Then, processing from S24 to S28 is repeated.

Layout generating section 12 is able to generate a plurality of unique layout candidates by performing the above-described process from S21 to S29.

FIG. 7 illustrates an example of a method of merging two element identification values by performing matrix multiplication. For example, suppose that an element identification value represented by a square matrix with two rows and two columns is assigned to each element. When two elements are combined by using the order-considered combination method, calculating unit 38 merges two element identification values corresponding to the two elements by performing matrix multiplication as illustrated in FIG. 7. As a result, calculating unit 38 is able to obtain, from matrix multiplication, a square matrix with two rows and two columns as an element identification value of the combined element.

FIG. 8 illustrates an example of a method of merging two element identification values by performing matrix addition. For example, suppose that an element identification value represented by a square matrix with two rows and two columns is assigned to each element. When two elements are combined by using the order-ignored combination method, calculating unit 38 merges two element identification values corresponding to the two elements by performing matrix addition as illustrated in FIG. 8. As a result, calculating unit 38 is able to obtain, from matrix addition, a square matrix with two rows and two columns as an element identification value of the combined element.

As described above, it is possible to obtain a square matrix having the same number of rows and the same number of columns as the individual element identification values before merger by using matrix multiplication and matrix addition. This allows calculating unit 38 to calculate, in the case where a combined element is further combined with another element, an element identification value of the new combined element on the basis of an element identification value obtained as the combined result.

After performing matrix multiplication or matrix addition, calculating unit 38 can round each entry value of the matrix to a value of a predetermined number of digits or less, and include the resulting matrix as the element identification value. This allows calculating unit 38 to avoid occurrence of an overflow caused by matrix multiplication or matrix addition.

Figure 9:
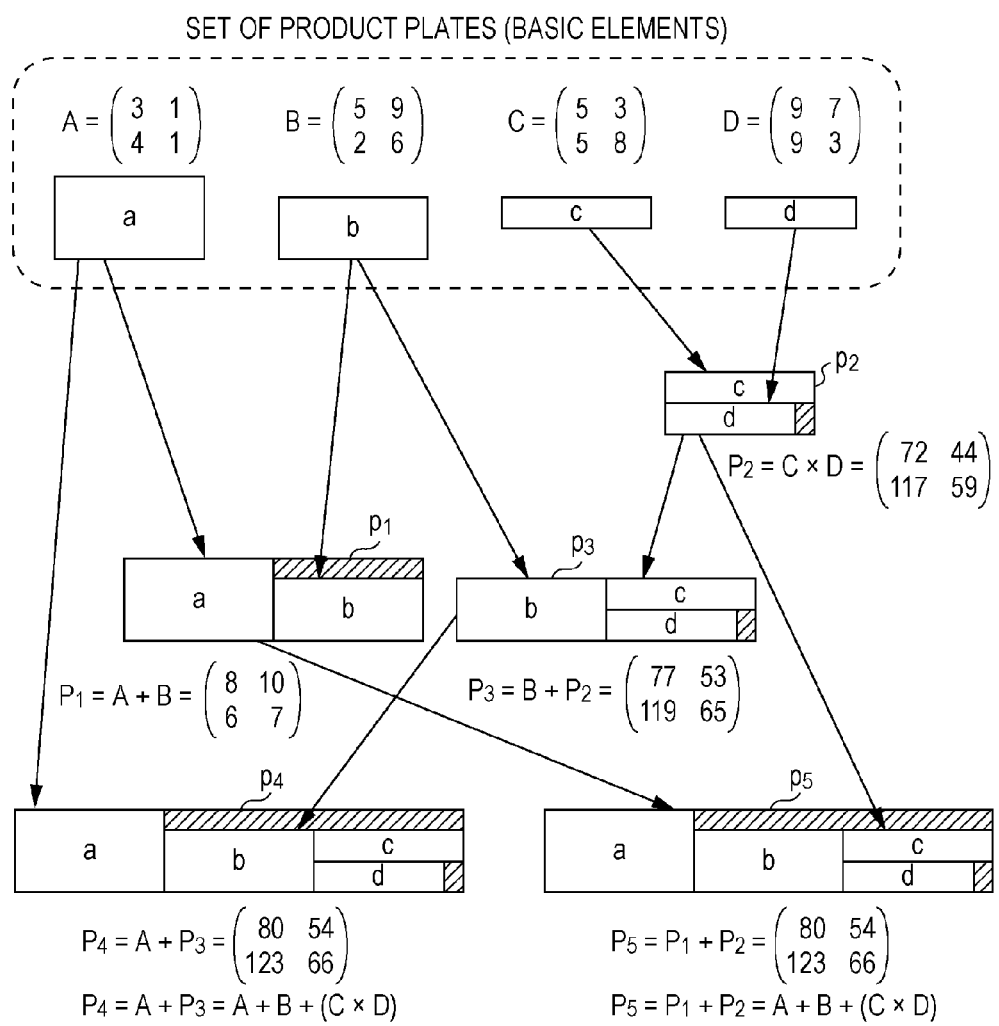
FIG. 9 illustrates an example of an element-identification-value calculation method performed in the case of generating layout candidates.

FIG. 9 illustrates an example of an element-identification-value calculation process performed in the case of generating layout candidates. For example, in the case of cutting out steel plates by cutting a long rolled plate in the short-side direction at the ironworks, the cost does not change if the cutting position changes. In contrast, in the case of cutting out steel plates by cutting a long rolled plate in a longitudinal direction at the ironworks, the cost possibly changes depending on the cutting position because of reasons, such as difficulty in cutting out steel plates from an end.

Accordingly, in the example of FIG. 9, in the case of combining product plates along the lengthwise direction (the longitudinal direction of a long rolled plate), generating unit 36 generates a layout candidate without considering the order in which product plates are combined. In contrast, in the case of combining product plates along the widthwise direction (the short-side direction of a long rolled plate), generating unit 36 generates a layout candidate while considering the order in which product plates are combined.

When generating unit 36 combines two elements in the lengthwise direction, calculating unit 38 merges two element identification values (matrices) assigned to the two elements by performing matrix addition so as to calculate an element identification value of the combined element. When generating unit 36 combines two element in the widthwise direction, calculating unit 38 merges two element identification values (matrices) assigned to the two elements by performing matrix multiplication in the order in which the two corresponding elements are arranged, so as to calculate an element identification value of the combined element.

FIG. 9 illustrates an example of generating layout candidates (combined elements) by combining first, second, third, and fourth basic elements a, b, c, and d, respectively. First basic element a is assigned a matrix A with two rows and two columns, which serves as an element identification value. Second basic element b is assigned a matrix B with two rows and two columns, which serves as an element identification value. Third basic element c is assigned a matrix C with two rows and two columns, which serves as an element identification value. Fourth basic element d is assigned a matrix D with two rows and two columns, which serves as an element identification value.

Also, in the example of FIG. 9, first, second, third, fourth, and fifth combined elements $p_1$, $p_2$, $p_3$, $p_4$, and $p_5$ are generated, respectively. Among these combined elements, fourth and fifth combined elements $p_4$ and $p_5$ are layout candidates.

First combined element $p_1$ is formed by combining first basic element a and second basic element b in the lengthwise direction. Thus, calculating unit 38 performs matrix addition (A+B) on element identification values A and B so as to generate element identification value $P_1$ of first combined element $p_1$. Second combined element $p_2$ is formed by combining third basic element c and fourth basic element d in the widthwise direction. Thus, calculating unit 38 performs matrix multiplication (C×D) on element identification values C and D so as to generate element identification value $P_2$ of the second combined element $p_2$.

Also, third combined element $p_3$ is formed by combining second basic element b and second combined element $p_2$ in the lengthwise direction. Thus, calculating unit 38 performs matrix addition (B+$P_2$) on element identification value B and $P_2$ so as to generate element identification value $P_3$ of third combined element $p_3$.

Further, fourth combined element $p_4$ is formed by combining first basic element a and third combined element $p_3$ in the lengthwise direction. Thus, calculating unit 38 performs matrix addition (A+$P_3$) on element identification values A and $P_3$ so as to generate element identification value $P_4$ of fourth combined element $p_4$.

Fifth combined element $p_5$ is formed by combining first combined element $p_1$ and second combined element $p_2$ in the lengthwise direction. Thus, calculating unit 38 performs matrix addition ($P_1$+$P_2$) on element identification values $P_1$ and $P_2$ so as to generate element identification value $P_5$ of fifth combined element $p_5$.

Fourth combined element $p_4$ and fifth combined element $p_5$ have been produced in different procedures but have the identical layouts of the plurality of included basic elements. Matrix multiplication and matrix addition are operations for which the associative law holds. Thus, even if the production procedures differ, calculating unit 38 obtains the same element identification values for the combined elements when layouts of the plurality of included basic elements are identical.

Accordingly, element identification value $P_4$ of fourth combined element $p_4$ is equal to element identification value $P_5$ of fifth combined element $p_5$. Consequently, duplication detecting unit 42 is able to eliminate one of a plurality of layout candidates which are produced in different procedures but in which layouts of the plurality of included basic elements are identical.

FIG. 10 illustrates an example of a layout candidate (sixth combined element $p_6$) in which the order in which some elements of included elements are combined in the lengthwise direction is different from that of the layout candidate (fourth combined element $p_4$) of FIG. 9, and also illustrates an example of the corresponding element identification value. Compared with fourth combined element $p_4$ of FIG. 9, sixth combined element $p_6$ illustrated in FIG. 10 is different in the order in which some elements of the included elements are combined in the lengthwise direction but is the same in the order in which the included elements are combined in the widthwise direction.

In the case where two elements are combined in the lengthwise direction, calculating unit 38 merges two element identification values by performing matrix addition (for which the associative law and the commutative law hold). Thus, combined elements that have different orders in which included elements are combined in the lengthwise direction have the same element identification value. For this reason, element identification value $P_6$ of sixth combined element $p_6$ illustrated in FIG. 10 is equal to element identification value $P_4$ of fourth combined element $p_4$ illustrated in FIG. 9. Consequently, duplication detecting unit 42 is able to eliminate one of a plurality of layout candidates that have different orders in which included elements are combined in the lengthwise direction.

FIG. 11 illustrates an example of a layout candidate (seventh combined element $p_7$) in which the order in which some elements of included elements are combined in the widthwise direction is different from that of the layout candidate (fourth combined element $p_4$) of FIG. 9, and also illustrates an example of the corresponding element identification value. Compared with fourth combined element $p_4$ of FIG. 9, seventh combined element $p_7$ illustrated in FIG. 11 is different in the order in which some elements of the included elements are combined in the widthwise direction.

When two elements are combined in the widthwise direction, calculating unit 38 merges two element identification values by performing matrix multiplication (for which the associative law holds but the commutative law does not hold). Thus, combined elements that have different orders in which included elements are combined in the widthwise direction have different element identification values. For this reason, element identification value $P_7$ of seventh combined element $p_7$ illustrated in FIG. 11 differs from element identification value $P_4$ of fourth combined element $p_4$ illustrated in FIG. 9. Consequently, duplication detecting unit 42 is able to register, without elimination, a plurality of layout candidates that have different orders in which included elements are combined in the widthwise direction.

FIG. 12 illustrates an example of a calculation for converting an element identification value represented by a matrix into a hash value. Hash value conversion unit 40 converts an element identification value generated by calculating unit 38 into a hash value.

When an element identification value is, for example, a matrix with two rows and two columns, hash value conversion unit 40 for example multiplies the value ($x_{11}$) at the first row and the first column by 1, the value ($x_{21}$) at the second row and the first column by 10, the value ($x_{12}$) at the first row and the second column by 100, and the value ($x_{22}$) at the second row and the second column by 1000, and then adds the resulting values as illustrated in FIG. 12. The calculation method is not limited to the above one, and hash value conversion unit 40 can convert an element identification value into a hash value by using any calculation method.

FIG. 13 illustrates an example of a method of merging two element identification values by performing an operation that corresponds to the order-considered combination method. The associative law holds for a matrix operation denoted by expression (11) below but the commutative law does not hold for the matrix operation denoted by expression (11).

$$\begin{pmatrix} a_{11} & a_{12} \\ a_{21} & a_{22} \end{pmatrix} \# \begin{pmatrix} b_{11} & b_{12} \\ b_{21} & b_{22} \end{pmatrix} = \begin{pmatrix} a_{11}b_{11} + a_{22}b_{21} & a_{21}b_{22} + a_{12}b_{12} \\ a_{21}b_{11} + a_{12}b_{21} & a_{11}b_{22} + a_{22}b_{12} \end{pmatrix} \quad (11)$$

Thus, when an element identification value represented by a matrix is assigned to each element and two elements are combined by using the order-considered combination method, calculating unit 38 can merge the two corresponding element identification values by performing the matrix operation denoted by expression (11).

When there are two directions in which elements are combined with the order being considered, calculating unit 38 has to merge element identification values by using different operations for the individual directions. For example, suppose that elements representing solid bodies are combined with the order in which elements are combined in the height direction (first direction) and the order in which elements are combined in the widthwise direction (second direction) being considered. In this case, calculating unit 38 merges element identification values by performing matrix multiplication for combination in the first direction, and merges element identification values by performing the operation denoted by expression (11) for combination in the second direction.

FIG. 14 illustrates an example of a method of combining two element identification values by performing an operation that corresponds to the order-ignored combination method. The associative law holds for a matrix operation denoted by expression (12) below. The commutative law also holds for the matrix operation denoted by expression (12).

$$\begin{pmatrix} a_{11} & a_{12} \\ a_{21} & a_{22} \end{pmatrix} \& \begin{pmatrix} b_{11} & b_{12} \\ b_{21} & b_{22} \end{pmatrix} = \begin{pmatrix} a_{11}b_{11} & a_{12}b_{12} \\ a_{21}b_{21} & a_{22}b_{22} \end{pmatrix} \quad (12)$$

Thus, when an element identification value represented by a matrix is assigned to each element and two elements are combined by using the order-ignored combination method, calculating unit 38 can merge the two corresponding element identification values by performing the matrix operation denoted by expression (12).

When there are two directions in which elements are combined with the order being ignored, calculating unit 38 can merge element identification values by using different operations for the individual directions. For example, suppose that elements representing solid bodies are combined with the order in which elements are combined in the height direction (first direction) and the order in which elements are combined in the widthwise direction (second direction) being ignored. In this case, calculating unit 38 merges element identification values by performing matrix addition for combination in the first direction, and merges element identification values by performing the operation denoted by expression (12) for combination in the second direction.

FIG. 15 illustrates an example of the hardware configuration of computer 1900 according to embodiments of the present invention. Computer 1900 includes a central processing unit (CPU) peripheral section, an input/output (I/O) section, and a legacy I/O section. The CPU peripheral section includes CPU 2000, random access memory (RAM) 2020, graphic controller 2075, and display device 2080, which are connected to each other via host controller 2082. The I/O section includes communication interface (I/F) 2030, hard disk drive (HDD) 2040, and compact disc-read only memory (CD-ROM) drive 2060, which are connected to host controller 2082 via I/O controller 2084. The legacy I/O section includes ROM 2010, flexible disk (FD) drive 2050, and I/O chip 2070, which are connected to I/O controller 2084.

Host controller 2082 connects RAM 2020 to CPU 2000 and graphic controller 2075, which access RAM 2020 at high transfer rates. CPU 2000 operates based on programs stored in ROM 2010 and RAM 2020 to control each component. Graphic controller 2075 acquires image data generated by CPU 2000 or the like in a frame buffer provided in RAM 2020, and displays an image of the image data on display device 2080. Alternatively, graphic controller 2075 can include a frame buffer that stores image data generated by CPU 2000 or the like therein.

I/O controller 2084 connects host controller 2082 to communication interface 2030, hard disk drive 2040, and CD-ROM drive 2060, which are relatively high-speed I/O devices. Communication interface 2030 communicates with another apparatus via a network. Hard disk drive 2040 stores programs and data utilized by CPU 2000 within computer 1900. CD-ROM drive 2060 reads programs or data from CD-ROM 2095 and supplies the program or the data to hard disk drive 2040 via RAM 2020.

I/O controller 2084 is also connected to ROM 2010, flexible disk drive 2050, and I/O chip 2070, which are relatively low-speed I/O devices. ROM 2010 stores a boot program executed at the time of booting of computer 1900 and/or programs depending on hardware of computer 1900. Flexible disk drive 2050 reads programs or data from flexible disk 2090 and supplies the programs or the data to hard disk drive 2040 via RAM 2020. I/O chip 2070 connects flexible disk drive 2050 to I/O controller 2084 and also connects various I/O devices to I/O controller 2084 via, for example, a parallel port, a serial port, a keyboard port, a mouse port, and so forth.

The programs are supplied to hard disk drive 2040 via RAM 2020 by the user and are stored on a recording medium, such as flexible disk 2090, CD-ROM 2095, or an IC card. The programs are read out from the recording medium, are installed into hard disk drive 2040 in computer 1900 via RAM 2020, and are executed by CPU 2000.

Programs that are installed into computer 1900 and that cause computer 1900 to function as information processing apparatus 10 include a layout generating module and a selecting module. The layout generating module includes a basic element storage module, a combined element storage module, a loading module, an assigning module, a generating module, a calculating module, a hash value conversion module, a duplication detecting module, and an adding module. These programs or modules operate with CPU 2000 to cause computer 1900 to function as layout generating section 12 including basic element storage unit 22, combined element storage unit 24, loading unit 32, assigning unit 34, generating unit 36, calculating unit 38, hash value conversion unit 40, duplication detecting unit 42, and adding unit 44; and as selecting section 14.

Information processing written in these programs is loaded to computer 1900, thereby functioning as layout generating section 12 and selecting section 14, which are specific means resulting from cooperation of software and the aforementioned various hardware resources. These specific means implement calculation or processing of information according to the usage of computer 1900 in embodiments, thereby constituting the unique information processing apparatus 10 according to the usage.

For example, when computer 1900 communicates with an external apparatus or the like, CPU 2000 executes a communication program that has been loaded to RAM 2020 and instructs communication interface 2030 to perform communication processing on the basis of processing content written in the communication program. Under control of CPU 2000, communication interface 2030 reads out transmission data stored in a transmission buffer or the like provided in a storage device, such as RAM 2020, hard disk drive 2040, flexible disk 2090, or CD-ROM 2095, and transmits the transmission data to the network; or communication interface 2030 writes reception data received from the network in a reception buffer or the like provided in the storage device. In this way, communication interface 2030 can transfer transmission/reception data from and to the storage device by using the direct memory access (DMA) method. Alternatively, CPU 2000 reads out data from a storage device or communication interface 2030 serving as a transfer source, and writes the data in communication interface 2030 or the storage device serving as a transfer destination, whereby transmission/reception data can be transferred.

CPU 2000 loads the entirety or necessary part of a file or a database stored in an external storage device, such as hard disk drive 2040, CD-ROM drive 2060 (CD-ROM 2095), or flexible disk drive 2050 (flexible disk 2090), into RAM 2020 by using the DMA transfer or the like. Then, CPU 2000 performs various types of processing on the data in RAM 2020. Then, CPU 2000 writes the processed data back to the external storage device using the DMA transfer or the like. In such processing, because RAM 2020 can be considered as a device that temporarily stores the content of the external storage device, RAM 2020, the external storage device, are collectively referred to as a memory, a storage unit, or a storage device. Various types of information, such as various programs, data, tables, and a database are stored in such a storage device and subjected to information processing. CPU 2000 can store a part of data of RAM 2020 in a cache memory and can perform read and write operations on the cache memory. Even in such an embodiment, since the cache memory undertakes some of the functions of RAM 2020, it is assumed that the cache memory is included in RAM 2020, a memory, and/or a storage device, unless otherwise noted.

CPU 2000 performs, on data read out from RAM 2020, various types of processing specified by an instruction sequence in a program. The various types of processing include various types of calculation, processing of information, condition determination, and retrieval and replacement of information described. Then, CPU 2000 writes the processed data back to RAM 2020. For example, when CPU 2000 performs condition determination, CPU 2000 compares each of the various types of variables described with another variable or a constant and determines whether a condition is satisfied. Examples of the condition include the variable is larger than the other variable or the constant, the variable is smaller than the other variable or the constant, the variable is equal to or larger than the other variable or the constant, the variable is equal to or smaller than the other variable or the constant, and the variable is equal to the other variable or the constant. When the condition is satisfied (or is not satisfied), the process branches to a different instruction sequence, or a subroutine is called.

Additionally, CPU 2000 can search for information stored in files or databases stored in storage devices. For example, when a plurality of entries, in each of which an attribute value of a second attribute is associated with an attribute value of a first attribute, are stored in a storage device, CPU 2000 searches for an entry whose attribute value of the first attribute satisfies a specified condition from among the plurality of entries stored in the storage device and reads out the attribute value of the second attribute stored in the entry, thereby being able to acquire the attribute value of the second attribute associated with the first attribute satisfying the predetermined condition.

The above-described programs or modules can be stored on an external recording medium. In addition to flexible disk 2090 and CD-ROM 2095, for example, an optical recording medium such as a DVD or a CD, a magneto-optical recording medium such as an MO, a tape medium, or a semiconductor memory such as an IC card can be utilized as the recording medium. Also, a storage device, such as a hard disk or a RAM, provided in a server system connected to a private communication network or the Internet can be included as the recording medium, and the programs can be supplied to computer 1900 via the network.

While the present invention has been described with reference to certain embodiments, the technical scope of the present invention is not limited to the scope of the description of the aforementioned embodiments. It is obvious to persons skilled in the art that various changes or improvements can be made in the aforementioned embodiments. It is obvious from the description of the claims that such changes or improvements are also included in the technical scope of the present invention.

It should be noted that, regarding the execution order of processes such as operations, procedures, steps, and stages in devices, systems, programs, and methods described in the claims, the description, and the drawings, expressions such as "before" and "prior to" are not explicitly given, and the devices, the systems, the programs, and the methods can be implemented in any order unless the output of a preceding process is utilized by a following process. Even when operation flows in the claims, the description, and the drawings are described using expressions such as "first" and "next" for convenience, this does not mean that such order is required.

What is claimed is:

1. An apparatus for cutting a material plate, the apparatus comprising:
   an assigning unit that assigns an element identification value to each of a plurality of basic elements;
   a generating unit that combines two or more basic elements, among said plurality of basic elements, so as to generate a combined element representing said two or more combined basic elements;
   a calculating unit that merges, through an operation corresponding to an element combination method, a plurality of element identification values individually assigned to said plurality of basic elements contained in said combined element, so as to calculate one element identification value for said combined element; and
   a cutter configured to cut the combined element from the material plate,
   wherein:
      when two elements are combined by an order-considered combination method, said calculating unit merges two corresponding element identification values through an operation for which the commutative law does not hold, and
      when two elements are combined by an order-ignored combination method, said calculating unit merges two corresponding element identification values through an operation for which the commutative law holds.

2. The apparatus of claim 1, wherein:
said generating unit generates a plurality of combined elements, and
said apparatus further comprises a duplication detecting unit that detects equivalent combined elements from among said plurality of combined elements on the basis of element identification values of said plurality of combined elements.

3. The apparatus of claim 2, wherein:
when two elements are combined by said order-considered combination method, said calculating unit merges two corresponding element identification values through an operation for which the associative law holds but the commutative law does not hold, and
when two elements are combined by said order-ignored combination method, said calculating unit merges two corresponding element identification values through an operation for which the associative law and the commutative law hold.

4. The apparatus of claim 3, further comprising:
a hash value conversion unit that converts said element identification value of each of said plurality of combined elements into a hash value in accordance with a predetermined rule,
wherein said duplication detecting unit detects equivalent combined elements from among said plurality of combined elements on the basis of said hash values of said element identification values of said plurality of combined elements.

5. The apparatus of claim 4, wherein upon detecting a plurality of combined elements having matching hash values of said element identification values, said duplication detecting unit further analyzes whether or not pluralities of basic elements contained in said plurality of combined elements match and whether or not said element combination methods match so as to detect equivalent combined elements.

6. The apparatus of claim 2, wherein said assigning unit assigns said element identification value represented by a square matrix to each of said plurality of basic elements.

7. The apparatus of claim 6, wherein when two elements are combined by said order-considered combination method, said calculating unit merges two corresponding element identification values through matrix multiplication.

8. The apparatus according to claim 6, wherein when two elements are combined by said order-ignored combination method, said calculating unit merges two corresponding element identification values through matrix addition.

9. The apparatus of claim 6, wherein when two elements are combined by said order-considered combination method, said calculating unit merges two corresponding element identification values through a matrix operation denoted by the expression:

$$\begin{pmatrix} a_{11} & a_{12} \\ a_{21} & a_{22} \end{pmatrix} \# \begin{pmatrix} b_{11} & b_{12} \\ b_{21} & b_{22} \end{pmatrix} = \begin{pmatrix} a_{11}b_{11} + a_{22}b_{21} & a_{21}b_{22} + a_{12}b_{12} \\ a_{21}b_{11} + a_{12}b_{21} & a_{11}b_{22} + a_{22}b_{12} \end{pmatrix}. \quad (11)$$

10. The apparatus of claim 6, wherein when two elements are combined by said order-ignored combination method, said calculating unit merges two corresponding element identification values through a matrix operation denoted by the expression:

$$\begin{pmatrix} a_{11} & a_{12} \\ a_{21} & a_{22} \end{pmatrix} \& \begin{pmatrix} b_{11} & b_{12} \\ b_{21} & b_{22} \end{pmatrix} = \begin{pmatrix} a_{11}b_{11} & a_{12}b_{12} \\ a_{21}b_{21} & a_{22}b_{22} \end{pmatrix}. \quad (12)$$

11. The apparatus of claim 6, wherein when two basic elements are combined with combination directions being distinguished from one another, said calculating unit merges two corresponding element identification values through different operations for individual combination directions.

12. The apparatus of claim 2, wherein said apparatus combines two or more basic elements, among said plurality of basic elements each representing a shape and a size, so as to generate said plurality of combined elements each representing said two or more combined basic elements, wherein:
said assigning unit assigns said element identification value to each of said plurality of basic elements on the basis of shape and size, and
said calculating unit merges two corresponding element identification values through either said operation for which the commutative law holds and/or said operation for which the commutative law does not hold.

13. The apparatus of claim 12, wherein:
said apparatus combines two or more basic elements, among said plurality of basic elements each representing a product plate, so as to generate a plurality of layout candidates each representing a cutting pattern for cutting out each of said two or more combined basic elements from the material plate,
said generating unit generates said plurality of layout candidates as said plurality of combined elements, and
said duplication detecting unit detects an equivalence among said plurality of layout candidates on the basis of element identification values of said plurality of layout candidates.

14. The apparatus of claim 13, wherein said assigning unit assigns a same element identification value to product plates having a same size.

15. The apparatus of claim 13, further comprising:
a combined element storage unit that stores a layout candidate and an element identification value in association with each other; and
an adding unit that additionally stores, when said element identification value of a new layout candidate generated by said generating unit does not match said element identification value of said layout candidate stored in the combined element storage unit, said new layout candidate and said corresponding element identification value in said combined element storage unit.

16. The apparatus of claim 15, wherein:
said combined element storage unit stores a number of product plates contained in each of said plurality of layout candidates in association with said corresponding layout candidate, and
said duplication detecting unit detects a number of product plates contained in said new layout candidate, extracts one or more layout candidates each including the same number of product plates as the detected number from said combined element storage unit, and determines an equivalence among said element identification value of said new layout candidate and said element identification values of one or more extracted layout candidates.

17. A non-transitory computer readable storage medium embodying computer readable instructions which, when implemented, cause a computer to cut a material plate, said information processing apparatus comprising:

an assigning unit that assigns an element identification value to each of a plurality of basic elements;

a generating unit that combines two or more basic elements, among said plurality of basic elements, so as to generate a combined element representing said two or more combined basic elements; and a calculating unit that merges, through an operation corresponding to an element combination method, a plurality of element identification values individually assigned to said plurality of basic elements contained in said combined element, so as to calculate one element identification value for said combined element; and a communication interface coupled to a cutter for cutting the combined element from the material plate, wherein:

when two elements are combined by an order-considered combination method, said calculating unit merges two corresponding element identification values through an operation for which a commutative law does not hold, and when two elements are combined by an order-ignored combination method, said calculating unit merges two corresponding element identification values through an operation for which the commutative law holds.

* * * * *